United States Patent [19]

Kruto

[11] 4,425,930
[45] Jan. 17, 1984

[54] FLUID FLOW CONTROL APPARATUS AND METHOD

[76] Inventor: Donald Kruto, 431 S. Easy St., Des Plaines, Ill. 60016

[21] Appl. No.: 261,864

[22] Filed: May 8, 1981

[51] Int. Cl.³ ............................................... F23N 1/00
[52] U.S. Cl. ........................................ 137/1; 137/599; 137/624.12; 137/628; 236/1 EB; 236/15 BG; 431/12; 431/18; 431/62; 432/12; 432/51
[58] Field of Search ................... 431/2, 6, 12, 18, 60, 431/62, 73; 432/12, 24, 51; 137/624.11, 624.2, 628, 599, 1; 236/1 EA, 1 EB, 15 BG; 266/96–98; 307/41; 62/175

[56] References Cited

U.S. PATENT DOCUMENTS

| | | | |
|---|---|---|---|
| 2,048,162 | 7/1936 | Kriechbaum | 431/62 |
| 2,517,869 | 8/1950 | Grapp | 432/12 |
| 2,808,209 | 10/1957 | Bressler | 431/20 |
| 3,076,605 | 2/1963 | Holden | 236/15 BG |
| 3,167,251 | 1/1965 | Kriechbaum | 236/1 EB |
| 3,486,732 | 12/1969 | Freeby et al. | 236/1 EB |
| 3,612,500 | 10/1971 | Gramer et al. | 432/44 |

Primary Examiner—Lee E. Barrett
Attorney, Agent, or Firm—Townsend and Townsend

[57] ABSTRACT

Apparatus and a method for controlling the flow of a fluid to a fluid-actuated system. The system is controlled by a sensor which senses a variable characteristic of the system, such as the air temperature. The apparatus includes a pair of solenoid valves, one valve being set to deliver a first volume of fluid per unit time and the other valve being set to deliver a second volume of fluid per unit time. The solenoid coil of one of the valves responds to the actuation and de-actuation of the sensor. The second valve has a solenoid coil controlled by a pair of switches. One of the switches is responsive to a first timing signal and the second switch is responsive to a second timing signal. One of the switches allows the second valve to be open for a first time interval during which the first valve is open; thereafter, the second valve is closed. The other switch of said pair causes the second valve to be opened after a second time interval following the end of the first time interval and to remain open so long as the sensor has not been de-actuated. Both valves are closed when the sensor is de-actuated.

25 Claims, 6 Drawing Figures

FLUID FLOW CONTROL APPARATUS AND METHOD

This invention relates to improvements in the control of fluid flow through flow lines and, more particularly, to apparatus and a method for controlling the flow of a fluid in such a manner as to permit the efficient control of fuel to the burner of a furnace for heating a space.

BACKGROUND OF THE INVENTION

In the operation of a gas or oil burning furnace, a single fluid line controlled by a solenoid valve is normally used to deliver the fuel to the burner of the furnace. The opening and closing of this valve is, in turn, controlled by a thermostatic switch. Only a single volume rate of flow of fuel can be realized with this fuel delivery system. When the fuel is delivered to the furnace burner upon closing of the thermostatic switch, the fuel is ignited and continues to burn until the thermostatic switch is opened, at which time the valve is closed and fuel flow ceases. The valve will remain closed until the thermostatic switch is again closed, whereupon the process is repeated. During the time in which the valve is closed, the heat energy in the space heated by furnace is progressively dissipated until the thermostatic switch closes, whereupon the valve opens and the furnace is operated to keep the space at a desired temperature as sensed by the thermostatic switch.

It has been found that such a space can be heated at a lower rate to conserve fuel without causing too much discomfort to the occupants of the space. If the volume rate of flow of fuel to the furnace is lowered, fuel costs can be decreased yet the heating of a space can be done efficiently even though it takes a longer time to produce the same heating results as with a higher volume rate of flow of fuel. Because of this finding, a need has arisen for improved apparatus and method for controlling the flow of fuel to a furnace in a manner to achieve a conservation of fuel without seriously causing discomfort to occupants of the space heated by the furnace.

SUMMARY OF THE INVENTION

The present invention satisfies the aforesaid need by providing apparatus and a method for controlling fluid flow by the sequential opening and closing of valve structure under the control of a sensor and timer means. The apparatus and method is especially suitable for controlling the flow of fuel to the burner of a gas or oil burning furnace used for heating a space whose air temperature can be sensed by a thermostatic switch. While the apparatus and method of this invention is suitable for a number of different applications, the invention will hereinafter be described with respect to the control of fuel flow to such a furnace.

The present invention operates to control the flow of fuel to a gas or oil burning furnace in such a way that a maximum flow of fuel to the furnace will occur immediately upon the closing of a thermostatic switch responsive to a demand for heat, and this flow will decrease to a minimum after a first time interval, such as 30 seconds to 1 minute. Thereafter, the flow of fuel will remain at a minimum for a second time interval, such as 8 to 10 minutes, after the first time interval or until the thermostatic switch opens. If the thermostatic switch has not opened at the end of the second time interval, the maximum flow of fuel will again occur and will continue until the heat demand is satisfied as indicated by the opening of the thermostatic switch. In this way, the heat requirements of a space heated by the furnace can be fully satisfied even though it takes a longer time to satisfy such demand, yet fuel can be conserved to thereby minimize the consumption of fuel as well as the overall heating costs.

The apparatus of this invention, in its preferred embodiment, includes a pair of solenoid valves whose fluid paths are connected in parallel with each other, a first valve being made or adjusted to deliver only a relatively small volume of fuel per unit time and the second valve being made or adjusted to deliver a relatively large volume of fuel per unit time. The first valve is controlled only by the thermostatic switch; thus, the first valve remains open at all times when the thermostatic switch is closed. The second valve is controlled by two switches, one of the switches being timed to be closed only for the first time interval mentioned above so that both valves will be open during such first time interval. The second switch is also timed so that it will open the second valve after the end of the second time interval mentioned above if there is a continued demand for heat, i.e., if the thermostatic switch is still closed. The two stitches associated with the second valve are coupled with timer which can be adjusted to vary the durations of the first and second time intervals. Thus, the apparatus of this invention is sufficiently flexible to permit it to be suitable for use with large and small installations as well as with existing or newly installed furnace systems. Other valve arrangements can be used in place of the parallel valve arrangement described above.

The primary object of the present invention is to provide apparatus and a method for controlling the flow of a fluid to a fluid-actuated system in a manner such that the volume rate of flow of fluid to the system can be varied in accordance with a timed sequence and as a function of a variable characteristic of the system to permit the invention to be used in a number of different applications including the control of a flowable fuel to a furnace.

An important object of this invention is to provide an improved fluid delivery apparatus and method for use with a gas or oil burning furnace in such a manner as to conserve fuel use by the furnace without causing creature discomfort in the space heated by the furnace yet the cost of heating the space is decreased and the apparatus can be used with existing or newly installed furnace installations.

Another object of the present invention is to provide apparatus and a method of the type described wherein valve structure is operated to deliver relatively small and relatively large volumes of fuel, respectively, to the furnace, whereby the valve structure can be timed for operation in a manner to conserve fuel, all of which can be accomplished without causing substantial creature discomfort in the space itself.

Other objects will become apparent as the following specifications progresses, reference being had to the accompanying drawing for an illustration of the invention.

Figure 1:
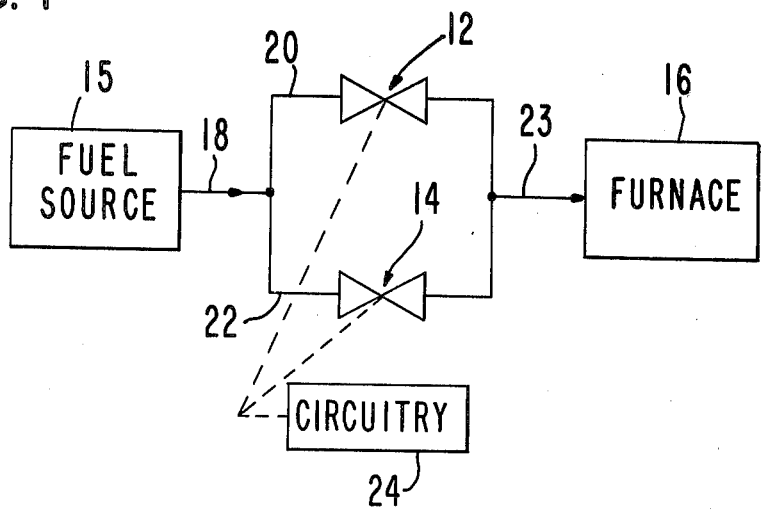
FIG. 1 is a schematic view of the fluid flow control apparatus of a preferred embodiment of the present invention for use with a furnace supplied with a flowable fuel, such as natural gas or heating oil.

The present invention, in a preferred embodiment (FIGS. 1–3), includes a fluid flow control apparatus or system 10 comprised of a pair of solenoid valves 12 and 14 for controlling the flow of a fuel, such as natural gas or heating oil, from a fuel source 15 to the burner of a furnace 16 for heating a space, such as the interior of a house. The fuel flows along an inlet line 18, then branches along lines 20 and 22 for flow through valves 12 and 14 when the valves are open, and then along a line 23 to the burner inlet of furnace 16. The opening and closing of valves 12 and 14 is controlled by circuitry 24 shown in block form in FIG. 1 but shown in more detail in FIG. 2.

System 10 operates in a manner such that valve 12 is open at all times during a heating cycle, i.e., when a thermostatic switch 28 (FIG. 2) is closed. Thermostatic switch 28 is used to sense the air temperature in the space to be heated by furnace 16. Valve 14 is open for a first, relatively short time interval, such as 30 seconds to 1 minute, immediately after thermostatic switch 28 has closed. Valve 14 is opened after a second time interval, such as 8 to 10 minutes, after the first time interval only if thermostatic switch 28 has not opened during the second time interval.

Valve 12 is made or adjusted so that it will provide only a relatively low volume rate of flow of fuel to furnace 16; whereas, valve 14 is made or adjusted so that it will provide a relatively high volume rate of flow of fuel to the furnace. Both valves are opened simultaneously when thermostatic switch 28 closes, then valve 14 will close after the first time interval, leaving valve 12 open to supply only a minimum volume of fuel to the furnace. This condition will continue until thermostatic switch 28 opens or until the lapse of the second time interval. Then valve 14 will again be opened and both valves will supply a maximum amount of fuel to the furnace until the thermostatic switch opens, whereupon both valves will close and will remain closed until the thermostatic switch opens once again to start a new heating cycle.

Circuit 24 includes a transformer 25 having a secondary coil 26 coupled at one side to thermostatic switch 28 by lead 30. A lead 32 couples the one side of the transformer coil 26 with a normally open switch 34 forming part of a first relay whose coil 36 is coupled to the output of a first voltage regulator 38 whose input is coupled by a lead 40 to the output of a rectifier 42. The input of rectifier 42 is coupled by lead 44 to thermostatic switch 28.

Switch 34 is also coupled by a lead 48 and a lead 50 to one side of the solenoid coil 52 of valve 12. A lead 54 is coupled to a lead 56 leading to the opposite side of transformer coil 26. Thus, when switch 34 is closed, the output voltage from transformer coil 26 is applied across coil 52 to cause valve 12 to open.

Lead 48 is also coupled with a normally open switch 58 which, in turn, is coupled by a lead 60 to solenoid coil 62 of valve 14. The opposite end of coil 62 is coupled by lead 54 to lead 56 of transformer coil 26. Thus, when switch 58 is closed, voltage is applied across coil 62 of valve 14 to cause this valve to open. However, valve 14 cannot be opened unless switch 34 is closed, even if switch 58 is closed.

A normally closed switch 64 is in parallel with switch 58. Switch 64, when it is closed, causes a voltage to be impressed across coil 62 to cause valve 14 to open.

A pair of timers 66 and 68 are used to control the opening and closing of switches 58 and 64. Timers 66 and 68 can be of any desired type. For purposes of illustration, each timer can be a Fairchild 555 timer.

Timer 66 has a signal output 70 coupled with the coil 72 of a second relay which controls the operation of switch 58, this switch being a part of the second relay. Timer 68 has a single output 74 coupled with the coil 76 of a third relay which controls the operation of switch 64, this switch being a part of the third relay.

A first, regulated voltage is applied to inputs 78 and 80 of timers 66 and 68 by a lead 82 coupled by a lead 84 to the output of a second voltage regulator 86. The input of regulator 86 is coupled by a lead 88 to the output of a second rectifier 90 whose input is coupled by a lead 92 to a lead 94 coupled with a normally open switch 96 which is controlled by the first relay, i.e., the relay having coil 36, switch 96 being a part of the first relay. Switch 96 is coupled to lead 32 and thereby to one side of transformer coil 26. Suppressors 98 and 100 are coupled across switches 34 and 96, respectively, to prevent arcing of these switches.

A second, regulated voltage is coupled to an input 102 of timer 66 and an input 104 of timer 68 by a lead 106 coupled to a lead 108 at the output of a third voltage regulator 110. An input lead 112 to regulator 110 is coupled to the output of a third rectifier 114 whose input is coupled to lead 94. A lead 115 is common to the other inputs of rectifiers 42, 90 and 114, and lead 116 is coupled to lead 56 connected to the other side of transformer coil 26.

Timers 66 and 68 have output signals at outputs 70 and 74 thereof when the timers are actuated. The timers are actuated when voltages are applied to the voltage inputs of the timers, such voltage inputs of timer 66 being inputs 78 and 102, the voltage inputs of timer 68 being inputs 80 and 104. Typical input voltages using Fairchild 555 timers are about 15 volts at inputs 78 and 80 and about 12 volts at inputs 102 and 104.

The duration of the output signal of timer 66 is controlled by variable resistor 116 and a fixed resistor 117. Similarly, a variable resistor 118 and a fixed resistor 120 control the duration of the output signal of timer 68.

Since timer 66 controls relay coil 72, normally open switch 58 will close when timer 66 is actuated and has an output signal. Since timer 68 controls relay coil 76, normally closed switch 64 will open when timer 68 is actuated and has an output signal.

Figure 2:
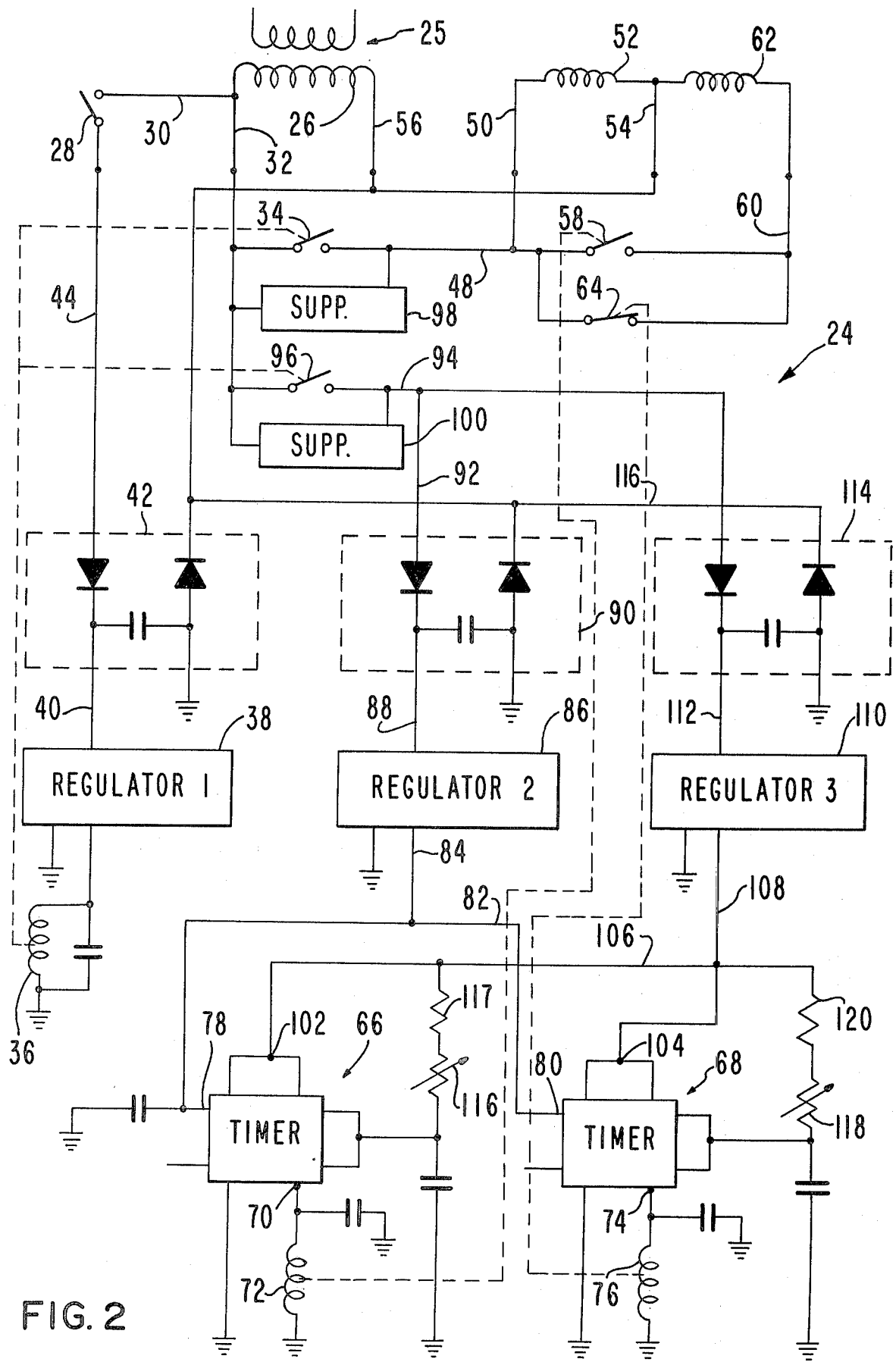
FIG. 2 is a schematic view of the circuit used for controlling the solenoid valves of the system of FIG. 1.

In operation, thermostatic switch 28 controls the operation of circuit 24. When thermostatic switch 28 is open as shown in FIG. 2, rectifier 42 remains unenergized so that voltage regulator 38 will have no output voltage. As a result, there will be no voltage across relay coil 36 and switches 34 and 96 will remain open. Thus, no voltage will be impressed across solenoid coils 52 and 62 of valves 12 and 14, respectively, and the valves will remain closed. Also, no voltages will be provided at the input terminals of rectifiers 90 and 114 so that timers 66 and 68 will not be actuated.

When thermostatic switch 28 closes, i.e., when there is a demand for heat in the space whose temperature is sensed by thermostatic switch 28, switches 34 and 96 close simultaneously. The closing of switch 34 causes coil 52 of valve 12 to be energized to open valve 12. The reason for this is that the closing of thermostatic switch 28 causes rectifier 42 to be energized by transformer coil 26 and voltage regulator 38 will have an output voltage impressed across relay coil 36, causing closing of switches 34 and 96.

When switch 96 closes, rectifiers 90 and 114 will have output voltages so that voltage regulators 86 and 110 will impress respective voltages at the voltage inputs of timers 66 and 68, thereby simultaneously actuating both timers and energizing relay coils 72 and 76. When relay coil 72 is energized, switch 58 is closed, thereby energizing solenoid coil 62 to open valve 14. Thus, for the period during which timer 66 is energized, valves 12 and 14 will both be open and a maximum volume of fuel will flow into the burner of furnace 16. When relay coil 76 is energized, it will cause switch 64 to open and remain open during the time in which timer 68 is actuated.

A typical sequence of operation is to have timer 66 actuated for a first time interval of about 30 seconds to 1 minute after thermostatic switch 28 closes. During this time, both valves 12 and 14 will be opened and both will supply fuel to the furnace burner. The purpose of having both valves open during this first time interval is to allow the fuel flow through valve 14 to assist the fuel flow through valve 12 in firing the burner of the furnace. At the end of this first time interval, timer 66 will be deactuated, causing switch 58 to open. This will cause valve 14 to close, leaving only valve 12 to supply a relatively small volume of fuel per unit time to the furnace.

Timer 68 will remain actuated for a second time interval such as 8 to 10 minutes, after the first time interval, during which second time interval switch 64 will be open. Thus, valve 14, once it is closed upon the deactuation of timer 66, will remain closed, since both switches 58 and 64 are open. However, valve 14 will open following the end of the second time interval when timer 68 has timed out if thermostatic switch 28 has not opened, i.e., if the heat demand has not yet been satisfied. This timing out of timer 68 will cause switch 64 to close so that valve 14 will be opened to supply additional fuel to the furnace until thermostatic switch 28 is opened. If the thermostatic switch opens before the end of the second time interval, valve 12 will be closed. System 10 will return to a non-operating condition and will then be ready for the next heating cycle which is started by the next closing of thermostatic switch 28.

By having valve 12 deliver only a relatively small volume of fuel to the furnace and having valve 14 deliver a relatively large volume of fuel, system 10 can be used to conserve fuel because the space to be heated can be heated for a slow rate during the second time interval yet valve 14 can assist valve 12 in firing the furnace burner during the first time interval. By permitting valve 14 to open after the second time interval, heating of the space can occur at a maximum rate to satisfy heat demand rapidly so as to prevent any creature discomfort which might arise due to the slow heating during the second time interval.

The present invention therefore provides a fuel conservation system which can be used on new as well as existing fuel lines to residential and industrial furnaces. Moreover, it can be used with any suitable type of fuel which is flowable and which can be controlled by fluid valves. While valves 12 and 14 are shown as being separate in FIG. 1, these valves can be in a single housing.

Figure 3:
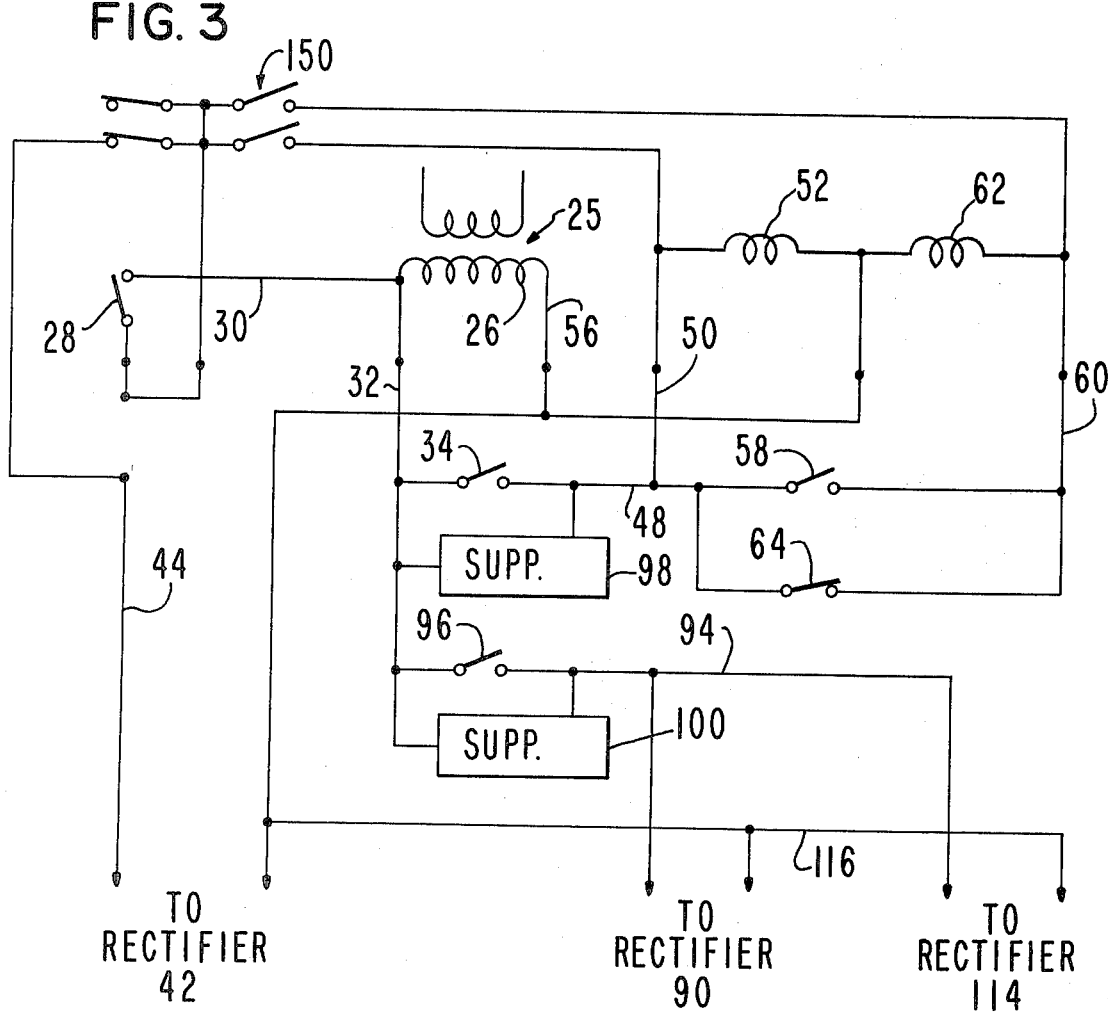
FIG. 3 is a view similar to FIG. 2 but showing a modification of the circuit of FIG. 2.

In a modification of the preferred embodiment of the present invention, circuit 24 can be provided, as shown in FIG. 3, with a double pole, double throw switch 150 coupled with lead 44 to permit the output voltage of transformer coil 26 to be applied directly to solenoid coils 52 and 62. Thus, switch 150 permits the user of system 10 to override circuit 24 so that both valves, once they are opened, will remain open until thermostatic switch 28 closes.

Figure 4:
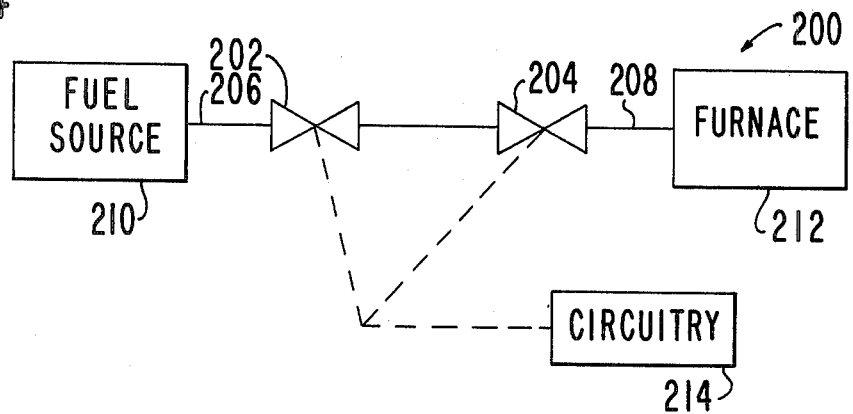
FIG. 4 is a view similar to FIG. 1 but showing a second embodiment of the invention.

A second embodiment of the fluid flow control apparatus a system of the present invention is broadly denoted by the numeral 200 and is shown in FIG. 4. System 200 includes a pair of solenoid valves 202 and 204 coupled by fluid lines 206 and 208 to a fuel source 210 and to the burner of a furnace 212, respectively. Electronic circuitry 214 is coupled with valves 202 and 204 for actuating the same in a predetermined manner. Circuitry 214 is similar in construction to circuitry 24 of system 10 with the solenoid coils of valves 202 and 204 arranged in the same manner as coils 52 and 62 in circuit 24 as shown in FIG. 2.

Valve 202 operates to deliver 100% fuel flow from fuel source 210 toward valve 204. Valve 204 is of the type which can be operable from 100% fuel flow to a reduced value of fuel flow, such as 40%. Valve 204 is conventional in construction and is set by the manufacturer to operate between the full or 100% setting to the partially open setting, such as 40%. Timer means, such as timer 66 and 68 of system 10, is provided in circuitry 214 to control the full opening and partial opening of valve 204. Valves 202 and 204 can be in a single housing if desired.

In operation, circuitry 214, which includes a thermostatic switch, controls the opening and closing of valve 202 as the thermostatic switch is actuated and deactuated. When valve 202 is opened, it is capable of delivering 100% fuel flow to valve 204. When valve 204 is full open, 100% of the fuel will pass to the burner of furnace 212. Typically, this will occur for a first time period of 30 seconds to 1 minutes after the thermostatic switch is actuated. Then, the timer means in circuitry 214 will operate in a manner described above with respect to timers 66 and 68 of system 10, and valve 204 will be controlled by a pair of switches, such as switches 58 and 64 of system 10 to partially close valve 204 to permit only a limited volume, such as 40%, of fuel to flow to the furnace burner for a second time period of 8 to 10 minutes after the first time period. If the thermostatic switch has not opened after this second time period, valve 204 will be fully opened and 100% fuel flow will again be directed to the furnace burner until the thermostatic switch is deactuated, whereupon valve 202 is closed.

Figure 5:
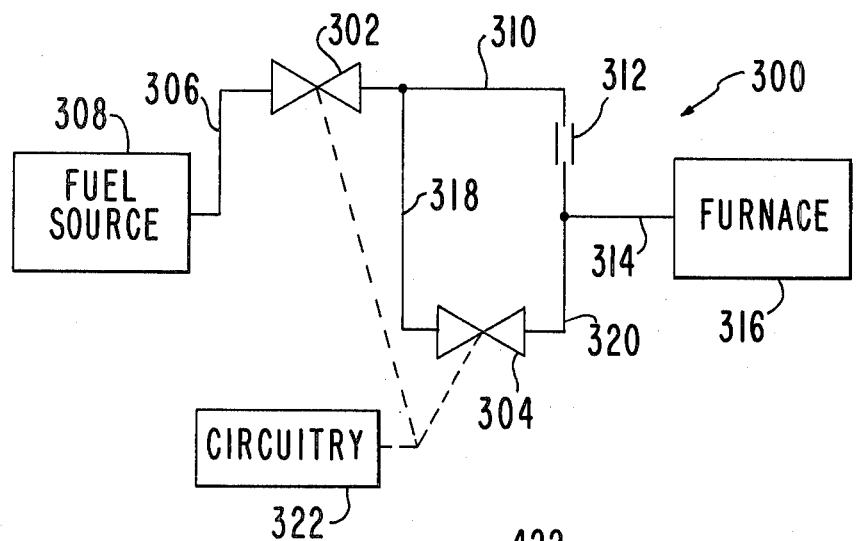
FIG. 5 is a view similar to FIGS. 1 and 4 but showing a third embodiment of the invention.

FIG. 5 shows a third embodiment of the fluid flow control apparatus or system of the present invention, this embodiment being denoted by the numeral 300. System 300 includes a pair of solenoid valves 302 and 304 connected in a series parallel arrangement as shown in FIG. 5. A fluid line 306 couples a fuel source 308 to the inlet side of valve 302. The outlet side of valve 302 is coupled by fuel line 310 to an orifice 312 which, in turn, is coupled by a fluid line 314 to the burner of a furnace 316. A fuel line 318 couples the outlet of valve 302 to the inlet of valve 304, and fluid line 320 couples the outlet of valve 304 to fluid line 314. Circuitry 322 controls the operation of valve 302 and 304.

Circuitry 322 operates substantially in the same manner as circuitry 214 in that valve 302 is opened and closed by the actuation and deactuation of a thermostatic switch forming part of circuitry 322, and valve 304 is controlled by timer means, such as timers 66 and 68 of circuitry 24, such timer means also forming a part of circuitry 322. When valve 302 is opened, it delivers 100% fuel flow through its outlet. When valve 304 is closed and valve 302 is opened, orifice 312 limits the fuel flow to the burner of the furnace to a certain reduced volume, such as 40% or 60%. However, when valve 304 is opened, 100% fuel flow will pass to the furnace burner because orifice 312 will pass a first portion of the fuel and valve 304 will pass a second portion of the fuel, the sum of the two portion being a 100% of the volume of fuel through valve 302.

System 300 operates substantially in the same manner as that described above with respect to system 200. In this respect, both valves 302 and 304 are open for a first time period, such as 30 seconds to 1 minute, after the thermostatic switch is actuated. Then, valve 304 closes for a second time period, such as 8 to 10 minutes, after the first time period, during which time fuel flows only through the orifice and to the furnace burner receives only a limited volume of fuel, such as 60% flow, from fuel source 308. After the second time period, valve 304 will open and 100% fuel flow will be directed to the furnace burner if the thermostatic switch has not been deactuated. Upon deactuation of the thermostatic switch, both valves 302 and 304 will close.

Figure 6:
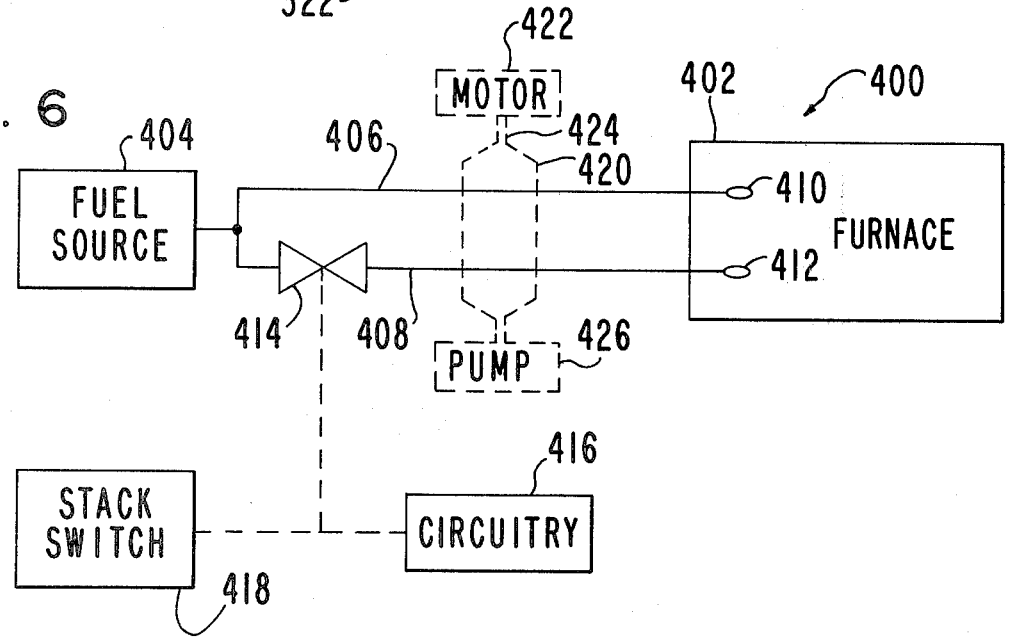
FIG. 6 is a view similar to FIGS. 1, 4 and 5 but showing a fourth embodiment of the invention.

FIG. 6 illustrates a fourth embodiment of the system of the present invention, the system being noted by the numeral 400. System 400 relates to an oil burning furnace 402 supplied with heating oil from a fuel source 404 which is coupled to fuel flow lines 406 and 408 having nozzles 410 and 412, respectively in furnace 402. A valve 414 in fluid line 408 is controlled by circuitry 416 and by a stack switch 418 controlled by the damper of the furnace. A squirrel cage rotor 420 operated by a motor 422 is used to force combustion air into the furnace when a thermostatic switch is actuated. Motor 422 has a drive shaft 424 which is also coupled to a fuel pump 426 which pumps fuel through line 406 to nozzle 410 and, when valve 414 is opened, pumps fuel through line 408 to nozzle 412.

Circuitry 416 includes the thermostatic switch and, when it is actuated, causes the stack switch 418 to operate motor 422 which operates pump 426 and rotates rotor 420. Thus, heating oil is pumped from source 404 through lines 406 and 408 to nozzles 410 and 412 for a first time period, such as 30 seconds to 1 minute, valve 414 being initially open during this period. In this way, 100% flow of fuel is directed to the burner furnace. After this first time period has elapsed, valve 414 is closed and remains closed by timer means in curcuitry 416 for a second time period, such as 8 to 10 minutes, so that the pump 426 causes heating oil to be pumped only through line 406.

At the end of the second time period, valve 414 will open if the thermostatic switch has not been deactuated. In such a case, 100% fuel flow will then be directed into the furnace burner until the thermostatic switch is deactuated, whereupon motor 422 ceases to operate and no heating oil is pumped to the furnace.

What is claimed is:

1. Apparatus for controlling the flow of fluid to a fluid-actuated system the operation of which affects a variable characteristic capable of being sensed comprising: means defining a pair of solenoid actuated fluid valves, each valve having an inlet adapted to be coupled to a source of fluid and an outlet adapted to be coupled to the fluid-actuated system; an electrical circuit means coupling the solenoid coils of said valves to a source of electrical power, said circuit means including an actuatable sensor responsive to said variable characteristic of said system for coupling the solenoid coils of the valves to said power source when the sensor is actuated, first and second actuatable control switches coupled with the solenoid coil of one of the valves, each control switch, when actuated, being operable to cause opening of said one valve if said sensor is actuated, and timer means coupled with the first and second control switches for causing the first control switch to be actuated for a first time interval after the sensor is actuated and to be de-actuated during a second time interval following the first time interval, said timing means being operable to deactuate the second control switch and to keep it de-actuated for the first and second time intervals and to actuate the second control switch after the end of the second time interval if the sensor remains actuated.

2. Apparatus as set forth in claim 1, wherein the timer means includes a first timer coupled with the first control switch and a second timer coupled to the second control switch.

3. Apparatus as set forth in claim 2, wherein each timer has a signal output, each control switch being responsive to the output signal of the respective timer.

4. Apparatus as set forth in claim 3, wherein each timer has means thereon for varying the duration of the output signal thereof.

5. Apparatus as set forth in claim 3, wherein is included a relay coil for each timer, respectively, each relay coil being coupled to the signal output of the respective timer, each control switch being responsive to a respective relay coil.

6. Apparatus as set forth in claim 1, wherein is included such means coupled with the solenoid coils of said valves in by-passing relationship to said circuit means, whereby the valves can be operated without using the circuit means.

7. Apparatus as set forth in claim 1, wherein the sensor comprises a thermostatic switch.

8. Apparatus as set forth in claim 1, wherein the valves have respective fluid flow paths in parallel with each other.

9. Apparatus as set forth in claim 8, wherein is included a source of fluid coupled to the inlets of said valves and a fluid actuated system coupled with the outlets of said valves.

10. Apparatus as set forth in claim 9, wherein said source includes a source of a flowable fuel, said fluid-actuated system including a furnace having a burner for burning said fuel.

11. Apparatus for controlling the flow of fuel to the burner of a furnace comprising: means defining a pair of solenoid-actuated fluid valves, each valve having an inlet adapted to be coupled to a source of fuel and an outlet adapted to be coupled to the burner of the furnace, each valve being operable to deliver a respective volume rate of flow of fuel to said furnace burner when the valve is open; an electrical circuit means for coupling the solenoid coils of said valves to a source of electrical power, said circuit means including an actuatable thermostatic switch for coupling the solenoid coil of one of the valves to said power source, first and second actuatable control switches for coupling the solenoid coil of the other valve to said power source when said thermostatic switch is actuated, and timer means coupled with the first and second control switches for causing the first control switch to be actuated for a first time interval after the thermostatic switch has been actuated and to be de-actuated during a second time interval following the first time interval, said timing means being operable to deactuate the second control switch and to keep it de-actuated during the first and second time intervals and to actuate the second control switch after the end of the second time interval if the thermostatic switch is still actuated.

12. A method of controlling the flow of a fluid to a fluid-actuated system the operation of which affects a variable characteristic comprising: allowing the fluid to flow at a first volume rate to the fluid-actuated system when said characteristic is in a first operative condition; reducing the fluid flow to a second volume rate less than said first volume rate at the end of a first time interval; continuing to allow said second volume rate of fluid to flow to said system during a second time interval following the first time interval and until said characteristic is in a second operative condition; if the characteristic remains in the first operative condition until the end of said second time interval, increasing said fluid flow to said first volume rate after said second time interval until the characteristic is in said second operative condition; and stopping said fluid flow to said system when the characteristic is in said second operative condition.

13. A method as set forth in claim 12, wherein said fluid-actuated system includes a furnace having a burner, said fluid comprising fuel for said burner, said characteristic being the air temperature of the space to which heat energy is supplied by the furnace.

14. A method as set forth in claim 12, wherein said allowing step includes causing said second volume of fluid to flow along a first path and a third volume of fluid to flow along a second path, the sum of said second and third volumes being equal to said first volume.

15. A method as set forth in claim 14, wherein said paths are in parallel with each other.

16. A method as set forth in claim 12, wherein the allowing step includes directing the fluid flow along a single path toward said system, said reducing step including throttling the fluid flow to said second volume, said stopping step including blocking said path.

17. A method as set forth in claim 16, wherein said throttling step is performed at a first location along said path, said blocking step being performed at a second location along said path.

18. A method as set forth in claim 12, wherein said allowing step includes directing a first portion of said first volume along a first path and directing a second portion of said first volume along a second path, said reducing step including blocking said second path, said increasing step including opening said second path, said stopping step includes blocking the flow of fluid before it enters the first and second paths.

19. A method as set forth in claim 12, wherein said allowing step includes pumping the fluid through a pair of paths, said reducing step includes blocking said fluid flow along one of the paths, said increasing step including opening said one path.

20. A method as set forth in claim 19, wherein said fluid is heating oil, said fluid-actuated system comprising an oil-burning furnace having a flue, said allowing step including opening said flue and blowing combustion air into the furnace.

21. Apparatus for controlling the flow of fluid to a fluid-actuated system the operation of which affects a variable characteristic capable of being sensed comprising: fluid line means for coupling said fluid-actuated system to a source of fluid; and means coupled with said fluid line means for controlling the flow of fluid therethrough, said controlling means including an actuatable sensor and means responsive to said sensor for permitting a first volume of fluid to flow through said fluid line means for a first period of time and a second volume of fluid to flow through said fluid line means for a second period of time following said first time period when said sensor is actuated, said permitting means being operable to permit said first volume of fluid to flow through said fluid line means after said second time period if said sensor remains actuated, said permitting means having means for preventing flow through said fluid line means when said sensor is deactuated.

22. Apparatus as set forth in claim 21, wherein said permitting means includes a pair of solenoid valves coupled together in parallel, said sensor being coupled to the solenoid coils of the valves to close the valves when the sensor is deactuated, and timer means coupled with said solenoid coils for causing both valves to be open during the first time period and after the second time period when said sensor is actuated and for causing one of the valves to be closed during the second time period.

23. Apparatus as set forth in claim 21, wherein said permitting means includes a pair of solenoid valves coupled together in series, said sensor being coupled to the solenoid coil of one of the valves to cause said one valve to open when said sensor is actuated, and timer means coupled to the other valve for causing it to be fully open during the first time period and after the second time period if said sensor is actuated and for causing the other valve to be partially open during the second time period.

24. Apparatus as set forth in claim 21, wherein said fluid line means include a first fluid line having a first solenoid valve and an orifice therein, and a second fluid line having a second solenoid valve therein, the second fluid line being in parallel with the portion of the first fluid line having said orifice, said sensor being coupled with the solenoid coil of said first valve to cause said first valve to open when said sensor is actuated, and timer means coupled to the second valve for causing it to open during the first time period and after the second time period if said sensor is actuated and for causing the second valve to be closed during the second time period.

25. Apparatus as set forth in claim 21, wherein said fluid line means includes a pair of fluid lines, each line having a fluid exit nozzle at one end thereof, the opposite end of the fluid lines adapted to be coupled to said fluid source, said permitting means includes a fluid pump coupled with said fluid lines for pumping fluid therethrough to said nozzles, a solenoid valve in one of the fluid lines, said pump being operated when said sensor is actuated, and timer means coupled to the valve for causing it to open during the first time period and after the second time period if said sensor is actuated and for causing the second valve to be closed during the second time period.

* * * * *